United States Patent [19]

Neumann et al.

[11] 4,095,965
[45] Jun. 20, 1978

[54] ABSORPTION FILTER

[75] Inventors: Gerhard Max Neumann; Detlef Sinhuber, both of Berlin, Germany

[73] Assignee: Delbag-Luftfilter GmbH, Germany

[21] Appl. No.: 711,536

[22] Filed: Aug. 4, 1976

[30] Foreign Application Priority Data

Aug. 27, 1975  Germany .............................. 7527377

[51] Int. Cl.[2] ............................................. B01D 53/30
[52] U.S. Cl. ......................................... 55/270; 55/275; 55/312; 55/350; 55/483; 55/518; 55/DIG. 9
[58] Field of Search ................. 55/212, 215, 270, 274, 55/275, 312, 314, 350, 483, 484, 512, 518, DIG. 9, DIG. 34, 18-20, 387; 210/85, 96 R

[56] References Cited

U.S. PATENT DOCUMENTS

| 561,203 | 6/1896 | Gripps | 55/312 |
| 2,033,665 | 3/1936 | Young | 55/350 |
| 3,330,101 | 7/1967 | Murphy, Jr. | 55/518 |
| 3,765,225 | 10/1973 | Rivers | 55/270 |
| 3,778,799 | 2/1973 | Bendayan | 55/275 |
| 3,868,237 | 2/1975 | Berz | 55/270 |

FOREIGN PATENT DOCUMENTS 480,507  2/1938  United Kingdom .................... 55/19

*Primary Examiner*—Frank W. Lutter
*Assistant Examiner*—David L. Lacey
*Attorney, Agent, or Firm*—Basile and Weintraub

[57] ABSTRACT

An absorption filter for the purification of gas or air streams, especially gas or air streams which contain toxic or radioactive contaminants.

6 Claims, 4 Drawing Figures

ABSORPTION FILTER

BACKGROUND OF THE INVENTION

I. Field of the Invention

The invention is concerned with an absorption filter for the purification of gas or air streams, especially such gas or air streams containing toxic or radioactive contaminants.

II. Description of the Prior Art

Absorption filters of this type are familiar in many different design versions. They consist of at least one filter chamber, which is characterized by featuring gas-permeable walls, arranged traverse to the direction of flow. The filter chambers conventionally consist of a prismatic housing, capable of being charged from the top with a granular absorption medium. The absorption medium, in turn, can be removed from the bottom of the housing after having reached a certain degree of saturation, while fresh substrate is being added from the top. Thus, the filter chamber can remain in virtually uninterrupted service. The filter chamber housing is equipped on one side with an adapter for the contaminated air and on the other side with an exit pipe for the purified air. The feed pipe and exit pipe are joined to each other by a bypass line which is parallel to the absorption medium of the filter chamber and is also filled with the absorption substrate. This bypass filter section allows for monitoring the degree of saturation of the absorption substrate contained in the filter chamber by removing the filter medium from the bypass filter section.

The contaminants carried by the gas or air stream, passing through the absorption filter, are progressively removed from the supply side of the chamber to the exit side. Since the contaminated gas or air streams always contain several different types of gaseous contaminants (which are absorbed by the filter medium with markedly different degrees of effectiveness), it is of extreme importance, especially in the presence of toxic or radioactive contaminants in gaseous form, to absorb these materials first in the filter medium, both with respect to time and location. It is also important to remove the more difficultly absorbed gaseous contaminants at regions which are closer to the exit side of the purified gas stream. It is especially important that the effectiveness of removal of these contaminants is not impaired in this region by the presence of the more easily absorbed contaminants. In other words, care must be taken to preserve a region of sufficient capacity near the pure air exit side for the absorption of gaseous contaminants in which none of the more easily absorbed contaminants are present.

In order to provide for a solution to this problem, an absorption filter has been designed (West German Patent No. DT-OS No. 2,239,827), which features an additional gas-permeable divider in the approximate center of the filter chamber, thus providing for two sequential chambers in series within one housing. The filter medium in both chambers is in direct contact with the central gas-permeable divider section. Both chamber sections can be individually and separately charged with the filter medium. The advantage of this design feature is to be found in the fact that the filter medium from the first section, initially exposed to the contaminated gas stream, can be seperately removed and replaced by fresh substrate without also having to empty the second chamber where the filter medium has not yet reached a degree of saturation requiring recharge. The exact determination of the time when replacement of the filter medium in the first chamber section is required can, however, not be made in the case of this state of the art design version, thus allowing for the danger that the chamber section intended for the absorption of the more difficultly removed contaminants will be contaminated from the direction of the saturated previous chamber section with the more easily absorbed contaminants and, thus, no longer allowing for an unambiguous guarantee that the more difficultly absorbed gaseous contaminants can be absorbed in the chamber section situated close to the pure air exit line. For the determination of the degree of saturation for this design version, only the familiar bypass filter section is available, which runs parallel to the adjoining chamber sections and bridges them and, therefore, is unable to provide any information concerning the degree of saturation of the chamber section close to the feed air side of the total assembly. The bypass filters serve as control filters and are arranged parallel to the filter housing and are also filled with filter medium. The bypass filter is exposed to the same gas stream; their filtration thickness is identical to the filter medium contained in the main chamber. By removing the bypass filter section, followed by analysis of the absorption medium, conclusions can be drawn with respect to the saturation state of the filter medium in the main chamber. This method is awkward, and information concerning the saturation of the filter medium with the more easily absorbed contaminants can only be obtained, if at all, with the time delay inherent in dismantling the bypass section and carrying out the analysis required. During this period the more easily absorbed contaminants could saturate the chamber section close to the contaminated air entry side, break through into the adjoining chamber section, and contaminate this half of the total assembly by enrichment with the easily absorbed components and, thus, impairing the trouble-free absorption of the more difficultly absorbed, toxic, gaseous contaminants.

SUMMARY OF THE INVENTION

It is the object of the instant invention to overcome this disadvantage, which is inherent to the state of the art design of filters consisting of subdivided partial chambers. It is furthermore the object of the invention to improve an absorption filter, featuring subdivided partial chambers, in such a manner as to allow for reliable and timely information available without undue loss of time, concerning the degree of saturation of the chamber section closest to the entry side of the contaminated air stream. Thus, an exchange of the filtration medium in this partial section of the filter guarantees an assured removal of the more difficultly removed contaminants in the respective filter section and positively prevents its contamination by the more easily absorbed contaminants.

This objective is achieved, according to the instant invention, by a design which provides for partial chambers according to the state of the art, featuring gas-permeable walls and, in addition, provides for a U-shaped frame interposed between the frame housing and between the chambers. Located in this U-shaped spacer frame section are sensing or measurement probes capable of continuously indicating the degree of saturation of the partial chamber closest to the entry side of the contaminated air stream. These measurement probes are in themselves known and are capable of monitoring the free space between chamber sections without any time delay, so that a break through of contaminants of the more easily absorbed type can be immediately registered; and any contamination of the downstream filter section, which would impair the capacity of this section to absorb the more difficultly removable contaminants, can thus be instantly prevented. A timely exchange of the filter medium in the upstream chamber section can thus be carried out without interrupting the filtration process.

It is a further characteristic of the instant invention to provide for the possibility of an optical or acoustical warning signal and/or an interruption of the contaminated air feed, based on reaching a degree of saturation corresponding to exhaustion of the absorption capacity in the upstream chamber section.

It is furthermore essential for the present invention that on both sides of the U-shaped frame perforated, gas-pervious sheeting is provided which is structurally secured against bending by support brackets. In line with the features, according to the instant invention, the arrangement of the gas-permeable walls between the two chamber sections on the U-frame allows for trouble-free and easy mounting, as well as easy cleaning of the filter chambers.

It is a further characteristic of the instant invention to provide for a bypass filter section, which is filled with the filtration medium and which is parallel to the feed line, or respectively the exit line, and has an absorption length which corresponds to the absorption capacity of the respective chamber section. Based on the feature of the U-shaped frame, spaced between the filter chambers, it is readily possible to provide for a bypass section for each individual chamber section. To this effect the entry feed pipe connects to the inside of the U-shaped frame on the one hand, while for the other bypass section, the inside of the U-shaped frame is connected with the exit pipe section. By these means a simple separate control of the filter media in each partial chamber is readily possible.

It is furthermore significant that the absorption distance of the bypass filter section consists of a series of cartridges, arranged sequentially in chambers, which are filled with the absorption medium.

It is furthermore essential to the instant invention that the bypass filtration section features two parallel filtration lines, which can be isolated from each other. This parallel arrangement of two bypass sections allows for monitoring without interruption, since during removal of one bypass section, by respective manipulation of the valves, the other section can be put in service.

Other objects, advantages and applications of the present invention will be seen by those skilled in the art of filters when the accompanying description of several examples of the best modes contemplated for practicing the invention is read in conjunction with the description of the accompanying drawings.

BRIEF DESCRIPTION OF THE DRAWINGS

The attached drawings show an exemplary design according to the invention wherein like reference numerals refer to like components throughout the several figures, and wherein.

DESCRIPTION OF THE PREFERRED EMBODIMENTS

Figure 1:
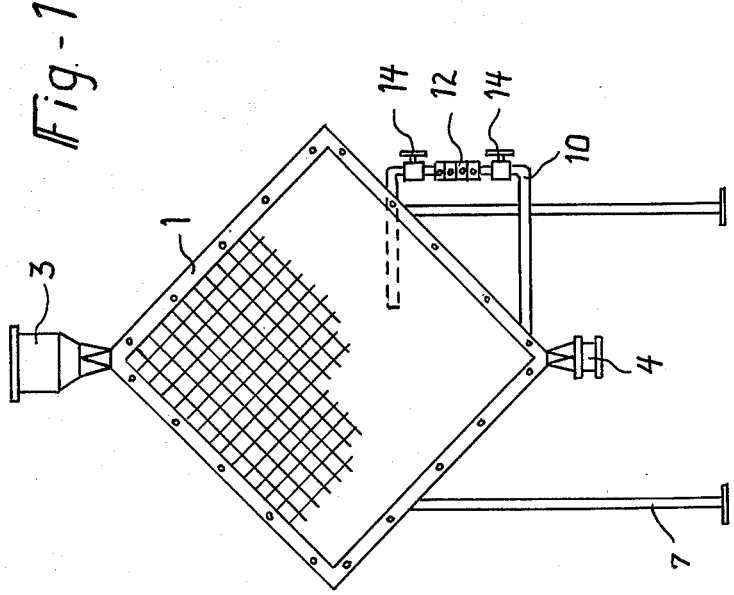
FIG. 1 is a front view of an absorption filter constructed according to the principles of the present invention.
Figure 2:
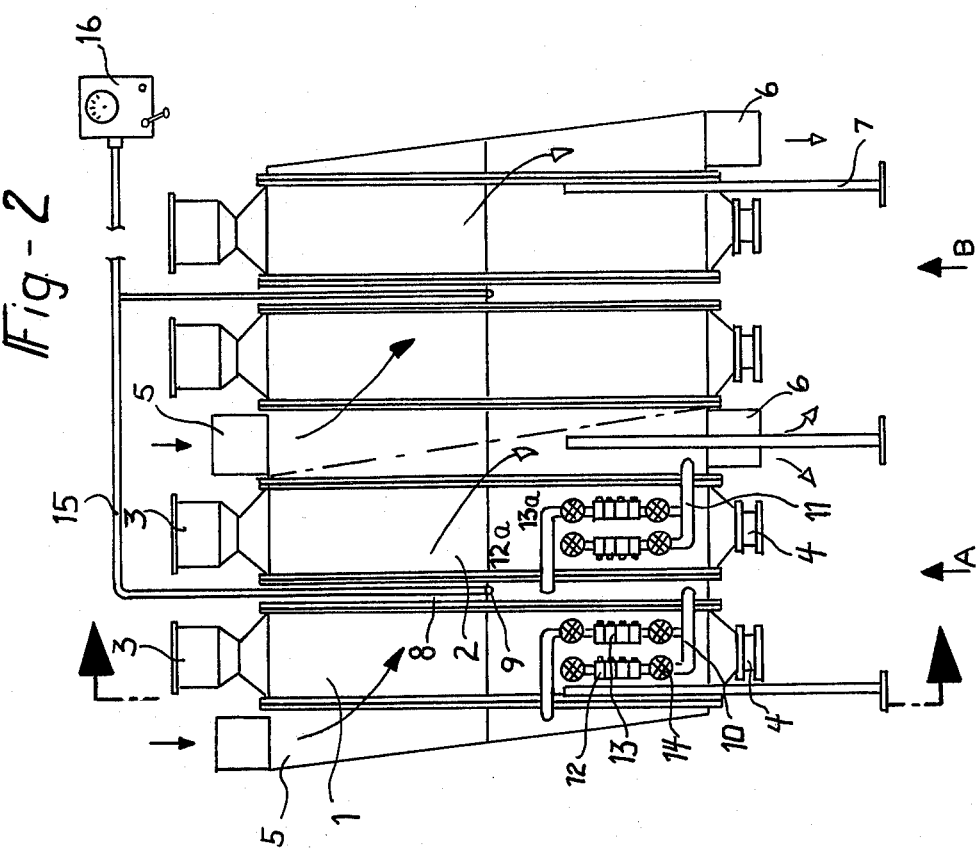
FIG. 2 is a right side elevational view of FIG. 1 demonstrating two absorption filters in parallel arrangement.
Figure 3:
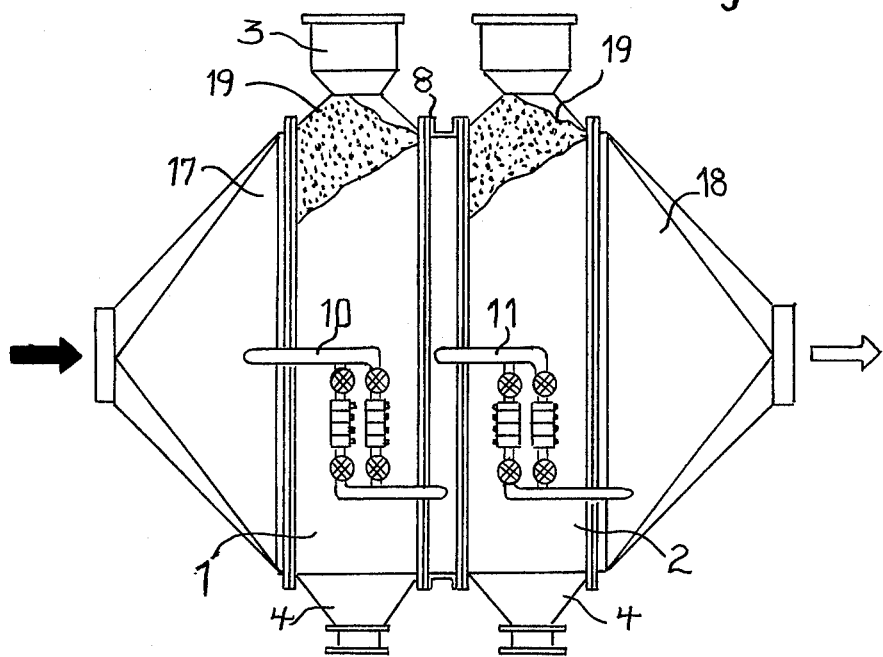
FIG. 3 is a modified design of the filter illustrated in FIG. 2.
Figure 4:
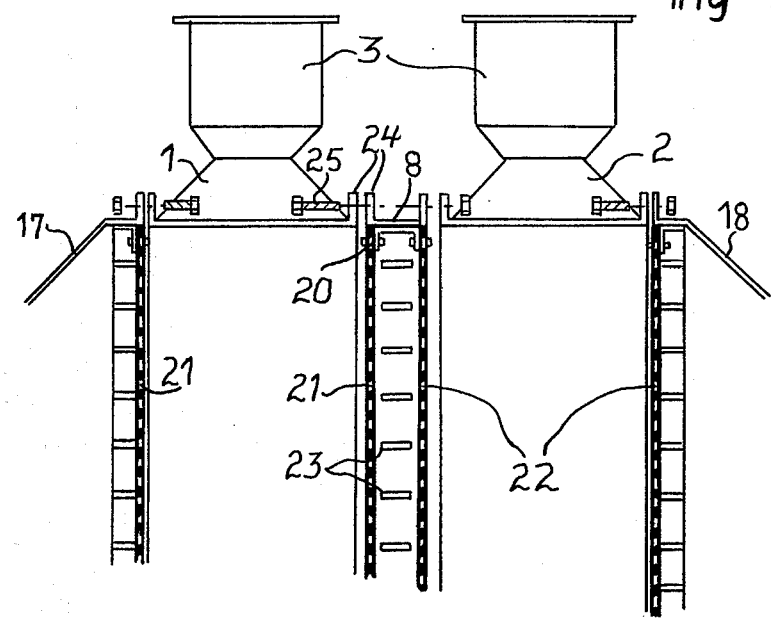
FIG. 4 is an expanded sectional presentation of FIG. 3.

Referring now to the drawings and, in particular, to FIGS. 1 and 2 wherein there is illustrated one example of the present invention in the form of two parallel absorption filters A and B, each of which has two housings 1 and 2 which are closed off on both sides by the gas-permeable, perforated sheets 21, or respectively 22 (FIG. 4). Each housing is equipped with a topside feeding adaptor for a granular absorption substrate 19, such as an active charcoal (FIG. 3), and a bottom side discharge adapter 4 used to remove the exhausted absorption substrate 19 from the housings 1 and 2, while simultaneously recharging fresh absorption substrate 19 through adapter 3. Between the two housings 1 and 2, a circumferential, U-shaped frame 8 is provided, joining the two housings 1 and 2 to each other in air-tight fashion and providing for an empty intermediate section. The contaminated air stream is charged to, respectively, absorption filter A or B, via feed line 5, which is arranged on the outside of housing 1. In turn, the clean air is removed via off-gas line 6, itself attached to the outside of housing 2. Absorption filter A, or respectively B, is mounted on frame 7. The air stream to be cleaned enters housing 1, via feed line 5, passes into housing 2 through the intermediate space provided by the U-shaped frame 8, and exits as a pure air steam from off-gas line 6. The intermediate space, provided by frame 8, contains a sensing probe 9, which monitors the degree of saturation of the air stream exiting from housing 1. The same probe 9 indicates the degree of saturation of this air stream in continuous fashion on a respective instrument 16, so that the filtration substrate 19, on reaching a predetermined degree of saturation, can be discharged from housing 1 and be replaced by fresh absorption material. In order to guarantee the reliable exchange of filter medium in housing 1, the monitoring instrument 16 activates an optical or acoustical warning signal or may interrupt the further contaminated air supply, such positive interference to be triggered by reaching a preset degree of saturation of the air stream monitored by the probe. Between feed line 5 and the U-shaped frame 8, a bypass filter line 10 is arranged, which serves as a control section for housing 1; similarly, between U-shaped frame 8 and the exit line 6, a second bypass line 11 is provided, serving as control for housing 2. This allows for separate control of housings 1 and 2 by means of the bypass sections 10 and 11. Each bypass line 10 and 11 provides for two separate filled absorption lines 12 and 13, which correspond in lengths to the capacity of the filtration substrate layers in housings 1 and 2 and can be separately closed off by valves 14 so that either one of the sections 12 or 13 can be used to determine the degree of saturation. The filled sections 12 and 13 are subdivided into separate, sequentially arranged chambers 12a and 13a, containing the cartridges filled with filtration substrate 19, which can be removed from chambers 12a and 13a to determine the degree of saturation.

As FIG. 4 shows, inside the U-shaped frame 8 a second U-shaped frame 20 is installed on the two legs of which the perforated screens 21 and 22 are fastened. The U-shaped frame 8 contains the structural support elements 23, which prevent a bending of perforated screens 21 and 22 towards the inside and, thus, provide for trouble-free functioning of both the monitoring and recording probe, as well as proper functioning of the bypass sections 10 and 11. During assembly of absorption filter A, or respectively B, the perforated screens 21 and 22 form the inner gas-permeable walls of housings 1 and 2, due to the fact that U-shaped frame 8 is joined in air-tight fashion with housings 1 and 2 by a bolt 25 passing through flange 24 of frame 8 and housings 1 and 2. FIG. 4 does not show the sensing or recording probe 9.

FIG. 3 demonstrates a modified design version of absorption filter A, due to the fact that in place of feed line 5 and off-gas line 6, in line with FIG. 2, the coaxial feed lines 17 and off-gas lines 18 are provided. The external perforated screens 21 and 22 of housings 1 and 2 in this case are fastened to the feed line adapter 17 and off-gas line adapter 18 and in assembly form the gas-permeable external walls of housings 1 and 2.

While two embodiments of the present invention have been disclosed, it should be understood by those skilled in the art that other forms of the invention may be had, all coming within the spirit of the invention and scope of the appended claims.

What is claimed is as follows:

1. An absorption filter for the purification of gas and/or airstreams, especially those containing toxic or radioactive contaminants, said absorption filter comprising:

a filter housing having an inlet and an outlet and first and second filter chambers, each charged with a granular absorption substrate, said housing inlet communicating with said first filter chamber and said outlet communicating with said second filter chamber, each filter chamber having transverse gas-permeable walls, said first and second filter chambers being separately chargeable with said substrate, said filter chambers being disposed in series in the direction of gas flow, an intermediate section joining said first and second filter chambers in an air-tight fashion such that the flow is from said inlet through said first filter chamber to said second filter chamber via said intermediate section and exhausted through said outlet;

a sensing probe disposed in said intermediate section to monitor the degree of saturation of the substrate in said first filter chamber;

a monitoring instrument connected to said probe and responsive to a predetermined degree of saturation of said substrate in said first filter chamber for triggering a warning signal; and a bypass filter section having an inlet connected to said housing inlet and an outlet connected to said intermediate section and filled with an absorption substrate, the length of said bypass filter section corresponding to the absorptive capacity of the filter substrate in said first filter chamber.

2. The filter defined in claim 1 wherein said intermediate section comprises a U-shaped frame which joins said first and second filter chambers in said air-tight fashion, said U-shaped frame having perforated sheeting on both sides thereof, said perforated sheeting forming the walls of said first and second filter chambers; and internal, structural support members supporting said walls against bending.

3. The filter defined in claim 1 wherein said bypass filter section comprises a series of cartridges arranged sequentially in subchambers which are filled with said absorption substrate.

4. The filter defined in claim 1 further comprising a second bypass filter section having an inlet connected to said intermediate section and an outlet connected to the outlet of said second filter chamber, said second bypass filter section being filled with an absorption substrate, the length of said second bypass filter section corresponding to the absorptive capacity of the filter substrate in said second filter chamber.

5. The filter defined in claim 4 wherein said second bypass filter section comprises a series of cartridges, arranged sequentially in subchambers which are filled with said absorption substrate.

6. The filter defined in claim 1 wherein said bypass filter section comprises two parallel, separately usable subsections; and valve means communicating with said separable subsections for selectively and individually opening and closing said subsections.

* * * * *